United States Patent
Yerubandi et al.

(10) Patent No.: US 10,119,392 B2
(45) Date of Patent: Nov. 6, 2018

(54) DETERMINING DEPTH OF LOSS ZONES IN SUBTERRANEAN FORMATIONS

(71) Applicant: Halliburton Energy Services, Inc., Houston, TX (US)

(72) Inventors: Krishna Babu Yerubandi, Houston, TX (US); Mark Ryan Savery, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 85 days.

(21) Appl. No.: 14/769,628

(22) PCT Filed: Nov. 26, 2014

(86) PCT No.: PCT/US2014/067545
§ 371 (c)(1),
(2) Date: Aug. 21, 2015

(87) PCT Pub. No.: WO2016/085483
PCT Pub. Date: Jun. 2, 2016

(65) Prior Publication Data
US 2016/0341031 A1    Nov. 24, 2016

(51) Int. Cl.
| | |
|---|---|
| *E21B 47/10* | (2012.01) |
| *E21B 47/04* | (2012.01) |
| *E21B 33/03* | (2006.01) |
| *E21B 33/13* | (2006.01) |
| *E21B 47/06* | (2012.01) |
| *C09K 8/50* | (2006.01) |

(52) U.S. Cl.
CPC ............. *E21B 47/10* (2013.01); *E21B 33/03* (2013.01); *E21B 33/13* (2013.01); *E21B 47/04* (2013.01); *E21B 47/06* (2013.01); *C09K 8/50* (2013.01)

(58) Field of Classification Search
CPC ................................. E21B 44/00; E21B 47/10
See application file for complete search history.

(56) References Cited

U.S. PATENT DOCUMENTS

| | | | | |
|---|---|---|---|---|
| 3,503,447 A | * | 3/1970 | Hamby, Jr. | ........... E21B 33/138 166/254.2 |
| 5,018,589 A | | 5/1991 | Williams | |
| 2005/0149307 A1 | * | 7/2005 | Gurpinar | ................. E21B 43/00 703/10 |
| 2009/0043555 A1 | * | 2/2009 | Busby | ..................... E21B 43/00 703/10 |
| 2009/0188718 A1 | | 7/2009 | Kaageson-Loe et al. | |
| 2009/0294174 A1 | | 12/2009 | Harmer et al. | |
| 2011/0042076 A1 | * | 2/2011 | Reitsma | .................. E21B 21/08 166/250.01 |
| 2011/0220349 A1 | | 9/2011 | Dakin | |
| 2011/0220350 A1 | | 9/2011 | Daccord et al. | |
| 2013/0325351 A1 | * | 12/2013 | Haberer | .................. E21B 49/08 702/12 |
| 2014/0116776 A1 | * | 5/2014 | Marx | ..................... E21B 44/00 175/24 |
| 2014/0351183 A1 | * | 11/2014 | Germain | ............. G06F 17/5009 706/12 |
| 2015/0134258 A1 | * | 5/2015 | Luppens | ............... E21B 49/003 702/11 |

OTHER PUBLICATIONS

International Search Report and Written Opinion for PCT/US2014/067545 dated Aug. 3, 2015.

* cited by examiner

*Primary Examiner* — Shane Bomar
*Assistant Examiner* — Steven A Macdonald
(74) *Attorney, Agent, or Firm* — Gilliam IP PLLC

(57) ABSTRACT

Methods of locating a loss zone in a wellbore in a subterranean formation including determining a calculated wellhead pressure, calculating a wellhead pressure differential, calculating a flow rate loss, estimating a loss zone depth, determining a modified calculated wellhead pressure, and calculating a modified wellhead pressure differential until the modified wellhead pressure differential corresponds to a loss zone location in the wellbore.

22 Claims, 1 Drawing Sheet

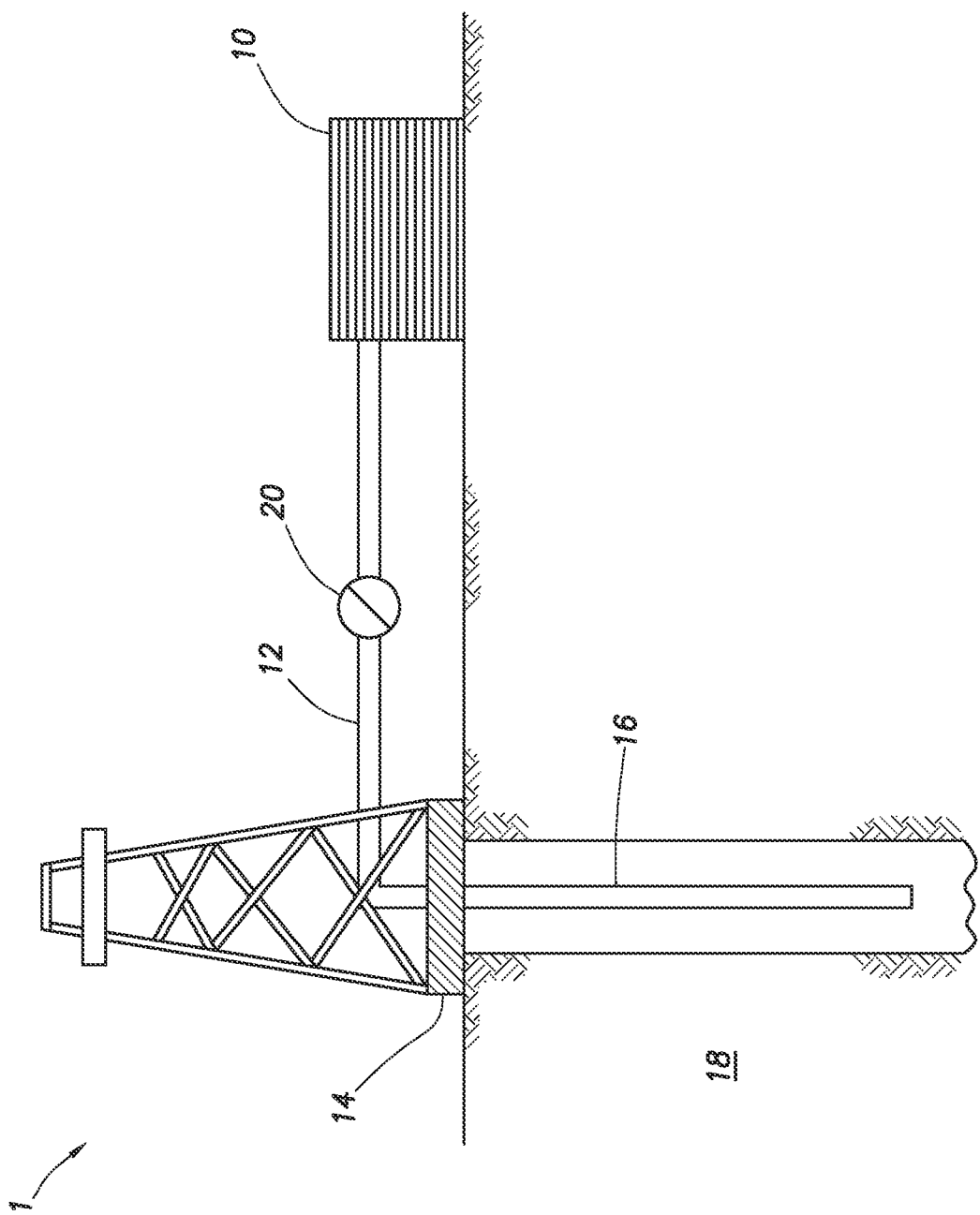

DETERMINING DEPTH OF LOSS ZONES IN SUBTERRANEAN FORMATIONS

BACKGROUND

The embodiments herein relate generally to subterranean formation operations and, more particularly, to determining the depth location of loss zones in a subterranean formation.

Hydrocarbon producing wells are typically formed by drilling a wellbore into a subterranean formation. A drilling fluid is circulated through a drill bit within the wellbore as the wellbore is being drilled. The drilling fluid is produced back to the surface of the wellbore with drilling cuttings for removal from the wellbore. The drilling fluid maintains a specific, balanced hydrostatic pressure within the wellbore, permitting all or most of the drilling fluid to be produced back to the surface. However, the hydrostatic pressure of the drilling fluid may be compromised if the drill bit encounters certain unfavorable subterranean zones, such as low pressure zones caused by natural fissures, fractures, vugs, or caverns, for example, into which the drilling fluid may become lost into the formation, termed "fluid loss zones" or "loss zones."

After a wellbore is drilled, a cement column may be placed around a casing (or liner string) in the wellbore. In some instances, the cement column is formed by pumping a cement slurry through the bottom of the casing and out through an annulus between the outer casing wall and the formation face of the wellbore. The cement slurry then cures in the annular space, thereby forming a sheath of hardened cement that, inter alia, supports and positions the casing in the wellbore and bonds the exterior surface of the casing to the subterranean formation. This process is referred to as "primary cementing." Among other things, the cement column may keep fresh water zones from becoming contaminated with produced fluids from within the wellbore, prevent unstable formations from caving in, and form a solid barrier to prevent fluid loss from the wellbore into the formation and the contamination of production zones with wellbore fluids. However, like drilling fluid, the cement slurry may be lost to loss zones, thereby compromising the integrity of the cement column.

Stimulation of subterranean formations may be performed using hydraulic fracturing treatments. In hydraulic fracturing treatments, a treatment fluid is pumped into a portion of a subterranean formation at a rate and pressure such that the subterranean formation breaks down and one or more fractures are formed. Typically, particulate solids are then deposited in the fractures. These particulate solids, or "proppant particulates" or "proppant," serve to prevent the fractures from fully closing once the hydraulic pressure is removed by forming a proppant pack. As used herein, the term "proppant pack" refers to a collection of proppant particulates in a fracture. By keeping the fracture from fully closing, the proppant particulates aid in forming conductive paths through which fluids may flow. During stimulation, the fracturing fluid may become lost to loss zones, as well. In such circumstances, the fracturing operation may be compromised, the proppant particulates may no longer be adequately suspended for placement into a fracture, and the like.

The consequences of fluid loss can be economically and environmentally devastating, ranging from minor volume loss of treatment fluids (e.g., drilling fluids, cement slurries, fracturing fluids, and the like), to delayed drilling and production operations, to an underground well blow-out, and the like. Therefore, the occurrence of fluid loss during hydrocarbon well operations typically requires immediate remedial steps. Remediation often involves introducing a composition into the wellbore to seal unfavorable subterranean zones and prevent leakoff of the treatment fluids within the formation to loss zones. Such compositions are generally referred to as "loss circulation materials."

However, treating a loss zone may be ineffective because the exact location of the zone is unknown. Moreover, because the loss zone location is unknown, the amount of loss circulation materials must often be sufficient to cover the entire length of a wellbore, even though only a small percentage of the wellbore may require treatment, thereby leading to inefficient materials use and associated costs.

BRIEF DESCRIPTION OF THE DRAWINGS

The following FIGURE is included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering various fluids of the embodiments described herein to a downhole location.

DETAILED DESCRIPTION

The embodiments herein relate generally to subterranean formation operations and, more particularly, to determining the depth location of loss zones in a subterranean formation. Specifically, the embodiments herein utilize real-time logging measurements in a wellbore during a subterranean formation operation, such as a drilling or cementing operation, and hydraulic calculations, coupled with the disclosed iterative methodology, to determine the depth location of a loss zone in a subterranean formation. The iterative methodology may be performed either during drilling, after drilling (e.g., during placement of a spacer fluid), before a cementing operation, or during a cementing operation. The depth location may be extrapolated to loss zone location in other locations in a subterranean formation oil field and may be used to make operation decisions regarding the wellbore or other wellbores formed or to be formed in the subterranean formation.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as pressures, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a method of locating a loss zone in a subterranean formation. The subterranean formation may have a wellbore drilled or being drilled therein. The wellbore may include a tubular therein, wherein an annulus is formed between the tubular and a face of the wellbore. The tubular may include, but is not limited to, a casing string, a flexible tubing, an inflexible tubing, a drill string, and any combination thereof. A treatment fluid is introduced into the wellbore and is then displaced up through the annulus between the tubular and the wellbore face. The treatment fluid may include, but is not limited to, non-aqueous fluid, an aqueous fluid, an aqueous-miscible fluid, a water-in-oil emulsion, an oil-in-water emulsion, and any combination thereof. The treatment fluid may be used as a drilling fluid, a spacer fluid, a stimulation fluid, or a cement slurry, in accordance with the methods of the present disclosure.

During the process of introducing and displacing the treatment fluid, real-time measurements are logged. The real-time measurements may be logged using a variety of downhole measurement tools, such as, for example, a logging-while-drilling tool, a wireline tool, and any combination thereof. The method of logging used for any particular downhole measurement tool is not limited to the methods of the present disclosure and may include, for example, electrical resistivity, acoustic impedance, nuclear technology (e.g., utilizing nuclear reactions that take place downhole in the wellbore or in the tool), radioactive bombardment, photoelectric absorption, Compton scattering, epithermal neutron bombardment, piezoelectric transmission, gamma radiation interaction, spontaneous potential difference determination, electrochemical potential different determination, spectral saturation, spectral noise measuring, and any combination thereof.

The real-time measurements that are logged may include, but are not limited to, actual wellhead pressure (AWP), treatment fluid inlet density ($\rho_i$), inlet flow rate ($\dot{Q}_i$), outlet flow rate ($\dot{Q}_o$), and treatment fluid inlet viscosity ($\mu_i$), and any combination thereof. The terms "inlet" and "outlet" refer to the point in which a treatment fluid is introduced into a wellbore and the point at which a treatment fluid exits the wellbore, respectively. In some instances, the inlet and outlet may refer to a surface location, but in other instances the point in which a treatment fluid is introduced into a wellbore may be a subsurface location (e.g., in some offshore applications, and the like. Other measurements may also be taken including, but not limited to, porosity, sonic velocity, electrical resistivity, wellbore diameter, permeability, wellbore fluid compositions, and the like, and combinations thereof.

A calculated wellhead pressure (CWP) is also determined using the real-time measurements. As used herein, the term "wellhead pressure" refers to the static or dynamic pressure just prior to the entrance of a wellbore. The CWP is calculated as a function of time or volume at either discrete time or discrete volume intervals, respectively. That is, the CWP takes into account the movement of the treatment fluid in the wellbore. The CWP is calculated based on the pressure at the outlet ($P_o$), the hydrostatic head of the annulus ($HH_{annulus}$)/the hydrostatic head of the tubular ($HH_{tubular}$), the frictional pressure drop for the length of the annulus ($\Delta P_{Frictional\ annulus}$), and the frictional pressure drop for the length of the tubular ($\Delta P_{Frictional\ tubular}$). The $\Delta P_{Frictional\ annulus}$ and the $\Delta P_{Frictional\ tubular}$ each take into account all fluids in the wellbore at any given instant of a particular operation being performed (e.g., a cementing operation). Specifically, the CWP is calculated according to Formula I:

$$CWP = (P_o + HH_{annulus} + \Delta P_{Frictional}) - (HH_{tubular} + \Delta P_{Frictional\ tubular})$$  Formula I The frictional pressure drop for the length of both the annulus and tubular is the sum of the frictional pressure drop for each unique wellbore section. The frictional pressure drop for a wellbore section is a function of treatment fluid inlet density ($\rho_i$), inlet flow rate ($\dot{Q}_i$), outlet flow rate ($\dot{Q}_o$), inlet viscosity ($\mu_i$), wellbore diameter, and wellbore section length, and may be determined using calculations known to those of skill in the art based on correlations thereof.

If the CWP is zero or a negative value, the wellbore is under "freefall," meaning that the treatment fluid is flowing in the wellbore under the influence of its own weight rather than the pumped inlet flow rate ($\dot{Q}_i$).

Based on the CWP and the actual wellhead pressure (AWP), a wellhead pressure differential ($\Delta WP$) is determined. The $\Delta WP$ is summed over the duration of a subterranean formation operation and calculated according to Formula III:

$$\Delta WP = |CWP - AWP|$$  Formula III

Next, a fluid loss rate ($\dot{Q}_{loss}$) is calculated according to Formula IV:

$$\dot{Q}_{loss} = \dot{Q}_i - \dot{Q}_o$$  Formula IV

A loss zone depth ($d_{est}$) at a depth along the wellbore is estimated by an operator. The estimated depth may be based on knowledge of previous wellbore fluid loss locations or may purely be a speculative guess, without departing from the scope of the present disclosure. Based on the estimated loss zone depth ($d_{est}$), a modified calculated wellhead pressure ($CWP_{mod}$) is determined based on hydraulic calculations, wherein the flow rate loss ($\dot{Q}_{loss}$) and the estimated loss zone depth ($d_{lz}$) are used as inputs. These hydraulic calculations may be those provided above with reference to calculating the CWP.

The steps of estimating the loss zone depth ($d_{est}$), determining a modified calculated wellhead pressure ($CWP_{mod}$), and calculating a modified wellhead pressure differential ($\Delta WP_{mod}$) may be repeated until the $\Delta WP_{mod}$ is minimized, preferably substantially equal to zero, whereby the estimated loss zone depth ($d_{est}$) substantially corresponds to a loss zone location ($d_{lz}$) in the wellbore. As used herein, the term "substantially" means largely but not necessarily wholly. That is, the loss zone location ($d_{lz}$) in the wellbore may not be exact, but correspond to a zonal area of the wellbore in which a loss zone exists, which can be treated using conventional or unconventional fluid loss control measures. In some embodiments, the steps of estimating the loss zone depth ($d_{est}$), determining a modified calculated wellhead pressure ($CWP_{mod}$), and calculating a modified wellhead pressure differential ($\Delta WP_{mod}$) may be repeated until the $\Delta WP_{mod}$ is in the range of 0 to a user defined maximum. Without being limited, the user defined maximum may in some cases be about 50,000, about 5,000, or about 500, encompassing any value and subset therebetween.

In some embodiments, the hydraulic calculations performed according to the methods of the present disclosure may be performed using commercially available hydraulic simulation software. For example, iCEM® SERVICE, available from Halliburton Energy Services, Inc. in Houston, Tex. may be used in accordance with the methods described herein to perform the hydraulic calculations, without departing from the scope of the present disclosure.

In some embodiments, remedial operations may be performed based on the loss zone location ($d_{lz}$) determined from applying the methods of the present disclosure. For example, a remedial operation may be performed to at least partially seal the loss zone location ($d_{lz}$). Such remedial operations may include, but are not limited to, ceasing operations, removing the treatment fluid from the wellbore, reformulating the treatment fluid, introducing a loss circulation pill into the wellbore, reducing the inlet flow rate ($\dot{Q}_i$), increasing the inlet flow rate ($\dot{Q}_i$), and any combination thereof.

In some embodiments, the methods described herein are performed in a first wellbore in a subterranean formation comprising an oilfield. As used herein, the term "oilfield" refers to a subterranean formation having roughly similar subsurface strata. Because an oilfield may have roughly similar subsurface strata, a loss zone location ($d_{lz}$) determined in one wellbore in the oilfield may be extrapolated to establish a loss zone location ($d_{lz}$) in a second wellbore in the same oilfield, or more generally to establish an oilfield loss zone location ($d_{field\ lz}$). The oilfield loss zone location ($d_{field\ lz}$) can then be used to perform a preventative operation to at least partially seal the oilfield loss zone location ($d_{field\ lz}$). Such preventative operations may take place before or after the second (or more) wellbore has been drilled into the oilfield. Such preventative operations may include, but are not limited to, introducing a loss circulation material into the second wellbore, reducing the inlet flow rate ($\dot{Q}_i$), increasing the inlet flow rate ($\dot{Q}_i$), adjusting the wellbore geometry, adjusting the location of the second wellbore, and any combination thereof. Although a "second" wellbore is referred to in discussing applying preventative operations using a determined oilfield loss zone location ($d_{field\ lz}$) in a first wellbore, the oilfield loss zone location ($d_{field\ lz}$) may be applied to any wellbore formed or to be formed in the oilfield (e.g., a third, fourth, etc. wellbore), without departing from the scope of the present disclosure.

In various embodiments, systems configured for delivering the treatment fluids (collectively referred to below simply as "fluids") described herein to a downhole location are described. In various embodiments, the systems may comprise a pump fluidly coupled to a tubular, the tubular containing the fluids described herein. It will be appreciated that while the system described below may be used for delivering fluids described herein, one or more portions of the fluid may be delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluids to a subterranean formation at or above a fracture gradient of the subterranean formation, but it may also be used in cases where fracturing is not desired. In some embodiments, the high pressure pump may be capable of fluidly conveying particulate matter, such as the magnetic proppant particulates or micro-proppant described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the fluids are formulated. In various embodiments, the pump (e.g., a low pressure pump, a high pressure pump, or a combination thereof) may convey the fluids from the mixing tank or other source of the fluids to the tubular. In other embodiments, however, the fluids may be formulated offsite and transported to a worksite, in which case the fluid may be introduced to the tubular via the pump directly from its shipping container (e.g., a truck, a railcar, a barge, or the like) or from a transport pipeline. In either case, the fluids may be drawn into the pump, elevated to an appropriate pressure, and then introduced into the tubular for delivery downhole.

FIG. 1 shows an illustrative schematic of a system that can deliver the fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the fluids of the embodiments herein may be formulated. The fluids may be conveyed via line 12 to wellhead 14, where the fluids enter tubular 16, tubular 16 extending from wellhead 14 into subterranean formation 18. Upon being ejected from tubular 16, the fluids may subsequently penetrate into subterranean formation 18. Pump 20 may be configured to raise the pressure of the fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the fluid may, in some embodiments, flow back to wellhead 14 and exit subterranean formation 18. In some embodiments, the fluid that has flowed back to wellhead 14 may subsequently be recovered and recirculated to subterranean formation 18.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A

A method of locating a loss zone in a subterranean formation comprising: (a) providing a wellbore in the subterranean formation having a tubular therein, wherein an annulus is formed between the tubular and a face of the wellbore; (b) introducing a treatment fluid into the wellbore through the tubular and displacing the treatment fluid up through the annulus; (c) logging real-time measurements during introducing and displacing the treatment fluid, the real-time measurements selected from the group consisting of actual wellhead pressure (AWP), treatment fluid inlet density ($\rho_i$), inlet flow rate ($\dot{Q}_i$), outlet flow rate ($\dot{Q}_o$), treatment fluid inlet viscosity ($\mu_i$), and any combination thereof; (d) determining a calculated wellhead pressure (CWP) based on the real-time measurements of step (c); (e) calculating a wellhead pressure differential ($\Delta$WP) based on Formula 1: $\Delta WP = |CWP - AWP|$; (f) calculating a flow rate loss ($\dot{Q}_{loss}$) based on Formula 2: $\dot{Q}_{loss} = \dot{Q}_i - \dot{Q}_o$; (g) estimating a loss zone depth ($d_{est}$) at a depth along the wellbore; (h) determining a modified calculated wellhead pressure ($CWP_{mod}$) based on hydraulic calculations, wherein the flow rate loss ($\dot{Q}_{loss}$) and the estimated loss zone depth ($d_{lz}$) are used as inputs; (i) calculating a modified wellhead pressure differential ($\Delta WP_{mod}$); and (j) repeating steps (g) through (i) until the modified wellhead pressure differential ($\Delta WP_{mod}$) is in the range of 0 to a user defined maximum, whereby the estimated loss zone depth ($d_{est}$) substantially corresponds to a loss zone location ($d_{lz}$) in the wellbore.

Embodiment A may have one or more of the following additional elements in any combination:

Element A1: Wherein the treatment fluid is selected from the group consisting of a non-aqueous fluid, an aqueous fluid, an aqueous-miscible fluid, a water-in-oil emulsion, an oil-in-water emulsion, and any combination thereof.

Element A2: Wherein the tubular is selected from the group consisting of a casing string, a flexible tubing, an inflexible tubing, a drill string, and any combination thereof.

Element A3: Wherein the hydraulic calculations of step (h) are performed using hydraulic simulation software.

Element A4: Wherein the user defined maximum is less than about 50,000.

Element A5: Further comprising a wellhead with the tubular extending therefrom and into the wellbore, and a pump fluidly coupled to the tubular.

By way of non-limiting example, exemplary combinations applicable to A include: A with A1 and A2; A with A1 and A3; A with A1 and A4; A with A1 and A5; A with A2 and A3; A with A2 and A4; A with A2 and A5; A with A3 and A4; A with A3 and A5; A with A4 and A5; A with A1, A2, and A3; A with A1, A2, and A4; A with A1, A2, and A5; A with A1, A3, and A4; A with A1, A3, and A5; A with A2, A3, and A4; A with A2, A4, and A5; A with A1, A2, A3, and A4; A with A1, A2, A3, A4, and A5.

Embodiment B

A method of locating a loss zone in a subterranean formation comprising: (a) providing a wellbore in the subterranean formation having a tubular therein, wherein an annulus is formed between the tubular and a face of the wellbore; (b) introducing a treatment fluid into the wellbore through the tubular and displacing the treatment fluid up through the annulus; (c) logging real-time measurements during introducing and displacing the treatment fluid, the real-time measurements selected from the group consisting of actual wellhead pressure (AWP), treatment fluid inlet density ($\rho_i$), inlet flow rate ($\dot{Q}_i$), outlet flow rate ($\dot{Q}_o$), treatment fluid inlet viscosity ($\mu_1$), and any combination thereof; (d) determining a calculated wellhead pressure (CWP) based on the real-time measurements of step (c); (e) calculating a wellhead pressure differential ($\Delta$WP) based on Formula 1: $\Delta WP = |CWP - AWP|$; (f) calculating a flow rate loss ($\dot{Q}_{loss}$) based on Formula 2: $\dot{Q}_{loss} = \dot{Q}_i - \dot{Q}_o$; (g) estimating a loss zone depth ($d_{est}$) at a depth along the wellbore; (h) determining a modified calculated wellhead pressure ($CWP_{mod}$) based on hydraulic calculations, wherein the flow rate loss ($\dot{Q}_{loss}$) and the estimated loss zone depth ($d_{lz}$) are used as inputs; (i) calculating a modified wellhead pressure differential ($\Delta WP_{mod}$); and (j) repeating steps (g) through (i) until the modified wellhead pressure differential ($\Delta WP_{mod}$) is in the range of 0 to a user defined maximum, whereby the estimated loss zone depth ($d_{est}$) substantially corresponds to a loss zone location ($d_{lz}$) in the wellbore; and (k) performing a remedial operation to at least partially seal the loss zone location ($d_{lz}$) in the wellbore.

Embodiment B may have one or more of the following additional elements in any combination:

Element B1: Wherein the remedial operation is selected from the group consisting of ceasing operations, removing the treatment fluid from the wellbore, reformulating the treatment fluid, introducing a loss circulation pill into the wellbore, reducing the inlet flow rate ($\dot{Q}_i$), increasing the inlet flow rate ($\dot{Q}_i$), and any combination thereof.

Element B2: Wherein the treatment fluid is selected from the group consisting of a non-aqueous fluid, an aqueous fluid, an aqueous-miscible fluid, a water-in-oil emulsion, an oil-in-water emulsion, and any combination thereof.

Element B3: Wherein the tubular is selected from the group consisting of a casing string, a flexible tubing, an inflexible tubing, a drill string, and any combination thereof.

Element B4: Wherein the hydraulic calculations of step (h) are performed using hydraulic simulation software.

Element B5: Wherein the user defined maximum is less than about 50,000.

Element B6: Further comprising a wellhead with the tubular extending therefrom and into the wellbore, and a pump fluidly coupled to the tubular.

By way of non-limiting example, exemplary combinations applicable to B include: B with B1 and B2; B with B1 and B3; B with B1 and B4; B with B1 and B5; B with B1 and B6; B with B2 and B3; B with B2 and B4; B with B2 and B5; B with B2 and B6; B with B3 and B4; B with B3 and B5; B with B3 and B6; B with B4 and B5; B with B4 and B6; B with B5 and B6; B with B1, B2, and B3; B with B1, B2, and B4; B with B1, B2, and B5; B with B1, B2, and B6; B with B1, B3, and B4; B with B1, B3, and B5; B with B1, B3, and B6; B with B2, B3, and B4; B with B2, B4, and B5; B with B2, B2, B4, B5, and B6; B with B1, B2, B3, and B4; B with B1, B2, B3, B4, and B5; B with B1, B2, B3, B4, B5, and B6.

Embodiment C

A method of locating a loss zone in a subterranean formation comprising: (a) providing a first wellbore in the subterranean formation having a tubular therein, wherein an annulus is formed between the tubular and a face of the wellbore, wherein subterranean formation comprises an oilfield; (b) introducing a first treatment fluid into the first wellbore through the tubular and displacing the first treatment fluid up through the annulus; (c) logging real-time measurements during introducing and displacing the first treatment fluid, the real-time measurements selected from the group consisting of actual wellhead pressure (AWP), first treatment fluid inlet density ($\rho_i$), inlet flow rate ($\dot{Q}_i$), outlet flow rate ($\dot{Q}_o$), treatment fluid inlet viscosity ($\mu_i$), and any combination thereof; (d) determining a calculated wellhead pressure (CWP) based on the real-time measurements of step (c); (e) calculating a wellhead pressure differential ($\Delta$WP) based on Formula 1: $\Delta$WP=|CWP−AWP|; (f) calculating a flow rate loss ($\dot{Q}_{loss}$) based on Formula 2: $\dot{Q}_{loss}=\dot{Q}_i-\dot{Q}_o$; (g) estimating a loss zone depth ($d_{est}$) at a depth along the wellbore; (h) determining a modified calculated wellhead pressure (CWP$_{mod}$) based on hydraulic calculations, wherein the flow rate loss ($\dot{Q}_{loss}$) and the estimated loss zone depth ($d_{lz}$) are used as inputs; (i) calculating a modified wellhead pressure differential ($\Delta$WP$_{mod}$); and (j) repeating steps (g) through (i) until the modified wellhead pressure differential ($\Delta$WP$_{mod}$) is in the range of 0 to a user defined maximum, whereby the estimated loss zone depth ($d_{est}$) substantially corresponds to a loss zone location ($d_{lz}$) in the first wellbore; (k) establishing an oilfield loss zone location ($d_{field\ lz}$) for the oilfield that is equivalent to the location of the loss zone in the wellbore; (l) providing a second wellbore in the subterranean formation having the oilfield loss zone location ($d_{field\ lz}$) therein; (m) performing a preventative operation to at least partially seal the oilfield loss zone location ($d_{field\ lz}$) in the second wellbore.

Embodiment C may have one or more of the following additional elements in any combination:

Element C1: Wherein the preventative operation in the second wellbore is selected from the group consisting of introducing a loss circulation material into the second wellbore, reducing the inlet flow rate ($\dot{Q}_i$), increasing the inlet flow rate ($\dot{Q}_i$), adjusting the wellbore geometry, adjusting the location of the second wellbore, and any combination thereof.

Element C2: Wherein the treatment fluid is selected from the group consisting of a non-aqueous fluid, an aqueous fluid, an aqueous-miscible fluid, a water-in-oil emulsion, an oil-in-water emulsion, and any combination thereof.

Element C3: Wherein the tubular is selected from the group consisting of a casing string, a flexible tubing, an inflexible tubing, a drill string, and any combination thereof.

Element C4: Wherein the hydraulic calculations of step (h) are performed using hydraulic simulation software.

Element C5: Wherein the user defined maximum is less than about 50,000.

Element C6: Further comprising a wellhead with the tubular extending therefrom and into the wellbore, and a pump fluidly coupled to the tubular.

By way of non-limiting example, exemplary combinations applicable to C include: C with C1 and C2; C with C1 and C3; C with C1 and C4; C with C1 and C5; C with C1 and C6; C with C2 and C3; C with C2 and C4; C with C2 and C5; C with C2 and C6; C with C3 and C4; C with C3 and C5; C with C3 and C6; C with C4 and C5; C with C4 and C6; C with C5 and C6; C with C1, C2, and C3; C with C1, C2, and C4; C with C1, C2, and C5; C with C1, C2, and C6; C with C1, C3, and C4; C with C1, C3, and C5; C with C1, C3, and C6; C with C2, C3, and C4; C with C2, C4, and C5; C with C2, C2, C4, C5, and C6; C with C1, C2, C3, and C4; C with C1, C2, C3, C4, and C5; C with C1, C2, C3, C4, C5, and C6.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method of locating a loss zone in a subterranean formation comprising:
   (a) providing a wellbore in the subterranean formation having a tubular therein, wherein an annulus is formed between the tubular and a face of the wellbore;
   (b) introducing a treatment fluid into the wellbore through the tubular and displacing the treatment fluid up through the annulus;
   (c) logging real-time measurements during introducing and displacing the treatment fluid, the real-time measurements selected from the group consisting of actual wellhead pressure (AWP), treatment fluid inlet density ($\rho_i$), inlet flow rate ($\dot{Q}_i$), outlet flow rate ($\dot{Q}_o$), treatment fluid inlet viscosity ($\mu_i$), and any combination thereof;
   (d) determining a calculated wellhead pressure (CWP) based on the real-time measurements of step (c);

(e) calculating a wellhead pressure differential ($\Delta$WP) based on Formula 1: $\Delta WP=|CWP-AWP|$;

(f) calculating a flow rate loss ($\dot{Q}_{loss}$) based on Formula 2: $\dot{Q}_{loss}=\dot{Q}_i-\dot{Q}_o$;

(g) estimating a loss zone depth ($d_{est}$) at a depth along the wellbore, wherein estimating the loss zone depth comprises receiving a user input indicating a predetermined loss zone depth value;

(h) determining a modified calculated wellhead pressure ($CWP_{mod}$) based on hydraulic calculations, wherein the flow rate loss ($\dot{Q}_{loss}$) and the estimated loss zone depth ($d_{lz}$) are used as inputs, wherein determining the modified calculated wellhead pressure comprises modifying the calculated wellhead pressure using the predetermined loss zone depth value from the received user input;

(i) calculating a modified wellhead pressure differential ($\Delta WP_{mod}$); and (j) repeating steps (g) through (i) until the modified wellhead pressure differential ($\Delta WP_{mod}$) is in the range of 0 to a user defined maximum, whereby the estimated loss zone depth ($d_{est}$) substantially corresponds to a loss zone location ($d_{lz}$) in the wellbore.

2. The method of claim 1, wherein the treatment fluid is selected from the group consisting of a non-aqueous fluid, an aqueous fluid, an aqueous-miscible fluid, a water-in-oil emulsion, an oil-in-water emulsion, and any combination thereof.

3. The method of claim 1, wherein the tubular is selected from the group consisting of a casing string, a flexible tubing, an inflexible tubing, a drill string, and any combination thereof.

4. The method of claim 1, wherein the hydraulic calculations of step (h) are performed using hydraulic simulation software.

5. The method of claim 1, wherein the user defined maximum is less than about 50,000.

6. The method of claim 1, further comprising a wellhead with the tubular extending therefrom and into the wellbore, and a pump fluidly coupled to the tubular.

7. The method of claim 1, wherein:

adjusting the modified wellhead pressure differential until the modified wellhead pressure differential is in the range of 0 to the user defined maximum, wherein the modified wellhead pressure differential is adjusted based on a change in the estimated loss zone depth.

8. The method of claim 1, further comprising:

extrapolating the estimated loss zone depth of the wellbore to establish a second loss zone location in a different wellbore in the subterranean formation.

9. A method of locating a loss zone in a subterranean formation comprising:

(a) providing a wellbore in the subterranean formation having a tubular therein, wherein an annulus is formed between the tubular and a face of the wellbore;

(b) introducing a treatment fluid into the wellbore through the tubular and displacing the treatment fluid up through the annulus;

(c) logging real-time measurements during introducing and displacing the treatment fluid, the real-time measurements selected from the group consisting of actual wellhead pressure (AWP), treatment fluid inlet density ($\rho_i$), inlet flow rate ($\dot{Q}_i$), outlet flow rate ($\dot{Q}_o$), treatment fluid inlet viscosity ($\mu_i$), and any combination thereof;

(d) determining a calculated wellhead pressure (CWP) based on the real-time measurements of step (c);

(e) calculating a wellhead pressure differential ($\Delta$WP) based on Formula 1: $\Delta WP=|CWP-AWP|$;

(f) calculating a flow rate loss ($\dot{Q}_{loss}$) based on Formula 2: $\dot{Q}_{loss}=\dot{Q}_i-\dot{Q}_o$;

(g) estimating a loss zone depth ($d_{est}$) at a depth along the wellbore, wherein estimating the loss zone depth comprises receiving a user input indicating a predetermined loss zone depth value;

(h) determining a modified calculated wellhead pressure ($CWP_{mod}$) based on hydraulic calculations, wherein the flow rate loss ($\dot{Q}_{loss}$) and the estimated loss zone depth ($d_{lz}$) are used as inputs, wherein determining the modified calculated wellhead pressure comprises modifying the calculated wellhead pressure using the predetermined loss zone depth value from the received user input;

(i) calculating a modified wellhead pressure differential ($\Delta WP_{mod}$); and (j) repeating steps (g) through (i) until the modified wellhead pressure differential ($\Delta WP_{mod}$) is in the range of 0 to a user defined maximum, whereby the estimated loss zone depth ($d_{est}$) substantially corresponds to a loss zone location ($d_{lz}$) in the wellbore, wherein the modified wellhead pressure differential is adjusted based on a change in the estimated loss zone depth; and (k) performing a remedial operation to at least partially seal the loss zone location ($d_{lz}$) in the wellbore.

10. The method of claim 9, wherein the remedial operation is selected from the group consisting of ceasing operations, removing the treatment fluid from the wellbore, reformulating the treatment fluid, introducing a loss circulation pill into the wellbore, reducing the inlet flow rate ($\dot{Q}_i$), increasing the inlet flow rate ($\dot{Q}_i$), and any combination thereof.

11. The method of claim 9, wherein the treatment fluid is selected from the group consisting of a non-aqueous fluid, an aqueous fluid, an aqueous-miscible fluid, a water-in-oil emulsion, an oil-in-water emulsion, and any combination thereof.

12. The method of claim 9, wherein the tubular is selected from the group consisting of a casing string, a flexible tubing, an inflexible tubing, a drill string, and any combination thereof.

13. The method of claim 9, wherein the hydraulic calculations of step (h) are performed using hydraulic simulation software.

14. The method of claim 9, wherein the user defined maximum is less than about 50,000.

15. The method of claim 9, further comprising a wellhead with the tubular extending therefrom and into the wellbore, and a pump fluidly coupled to the tubular.

16. A method of locating a loss zone in a subterranean formation comprising:

(a) providing a first wellbore in the subterranean formation having a tubular therein, wherein an annulus is formed between the tubular and a face of the wellbore, wherein subterranean formation comprises an oilfield;

(b) introducing a first treatment fluid into the first wellbore through the tubular and displacing the first treatment fluid up through the annulus;

(c) logging real-time measurements during introducing and displacing the treatment fluid, the real-time measurements selected from the group consisting of actual wellhead pressure (AWP), first treatment fluid inlet density ($\rho_i$), inlet flow rate ($\dot{Q}_i$), outlet flow rate ($\dot{Q}_o$), treatment fluid inlet viscosity ($\mu_i$), and any combination thereof;

(d) determining a calculated wellhead pressure (CWP) based on the real-time measurements of step (c);

(e) calculating a wellhead pressure differential ($\Delta$WP) based on Formula 1: $\Delta$WP=|CWP−AWP|;

(f) calculating a flow rate loss ($\dot{Q}_{loss}$) based on Formula 2: $\dot{Q}_{loss}=\dot{Q}_i-\dot{Q}_o$;

(g) estimating a loss zone depth ($d_{est}$) at a depth along the wellbore, wherein estimating the loss zone depth comprises receiving a user input indicating a predetermined loss zone depth value;

(h) determining a modified calculated wellhead pressure ($CWP_{mod}$) based on hydraulic calculations, wherein the flow rate loss ($\dot{Q}_{loss}$) and the estimated loss zone depth ($d_{lz}$) are used as inputs, wherein determining the modified calculated wellhead pressure comprises modifying the calculated wellhead pressure using the predetermined loss zone depth value from the received user input;

(i) calculating a modified wellhead pressure differential ($\Delta WP_{mod}$); and (j) repeating steps (g) through (i) until the modified wellhead pressure differential ($\Delta WP_{mod}$) is in the range of 0 to a user defined maximum, whereby the estimated loss zone depth ($d_{est}$) substantially corresponds to a loss zone location ($d_{lz}$) in the first wellbore;

(k) establishing an oilfield loss zone location ($d_{field\ lz}$) for the oilfield that is equivalent to the location of the loss zone in the wellbore;

(l) providing a second wellbore in the subterranean formation having the oilfield loss zone location ($d_{field\ lz}$) therein;

(m) performing a preventative operation to at least partially seal the oilfield loss zone location ($d_{field\ lz}$) in the second wellbore.

17. The method of claim 16, wherein the preventative operation in the second wellbore is selected from the group consisting of introducing a loss circulation material into the second wellbore, reducing the inlet flow rate ($\dot{Q}_i$), increasing the inlet flow rate ($\dot{Q}_i$), adjusting the wellbore geometry, adjusting the location of the second wellbore, and any combination thereof.

18. The method of claim 16, wherein the treatment fluid is selected from the group consisting of a non-aqueous fluid, an aqueous fluid, an aqueous-miscible fluid, a water-in-oil emulsion, an oil-in-water emulsion, and any combination thereof.

19. The method of claim 16, wherein the tubular is selected from the group consisting of a casing string, a flexible tubing, an inflexible tubing, a drill string, and any combination thereof.

20. The method of claim 16, wherein the hydraulic calculations of step (h) are performed using hydraulic simulation software.

21. The method of claim 16, wherein the user defined maximum is less than about 50,000.

22. The method of claim 16, further comprising a wellhead with the tubular extending therefrom and into the wellbore, and a pump fluidly coupled to the tubular.

\* \* \* \* \*